Dec. 17, 1957      C. E. HARTLEY      2,816,388
FISHING ROD SUPPORT AND ALARM
Filed Sept. 29, 1955      2 Sheets-Sheet 1
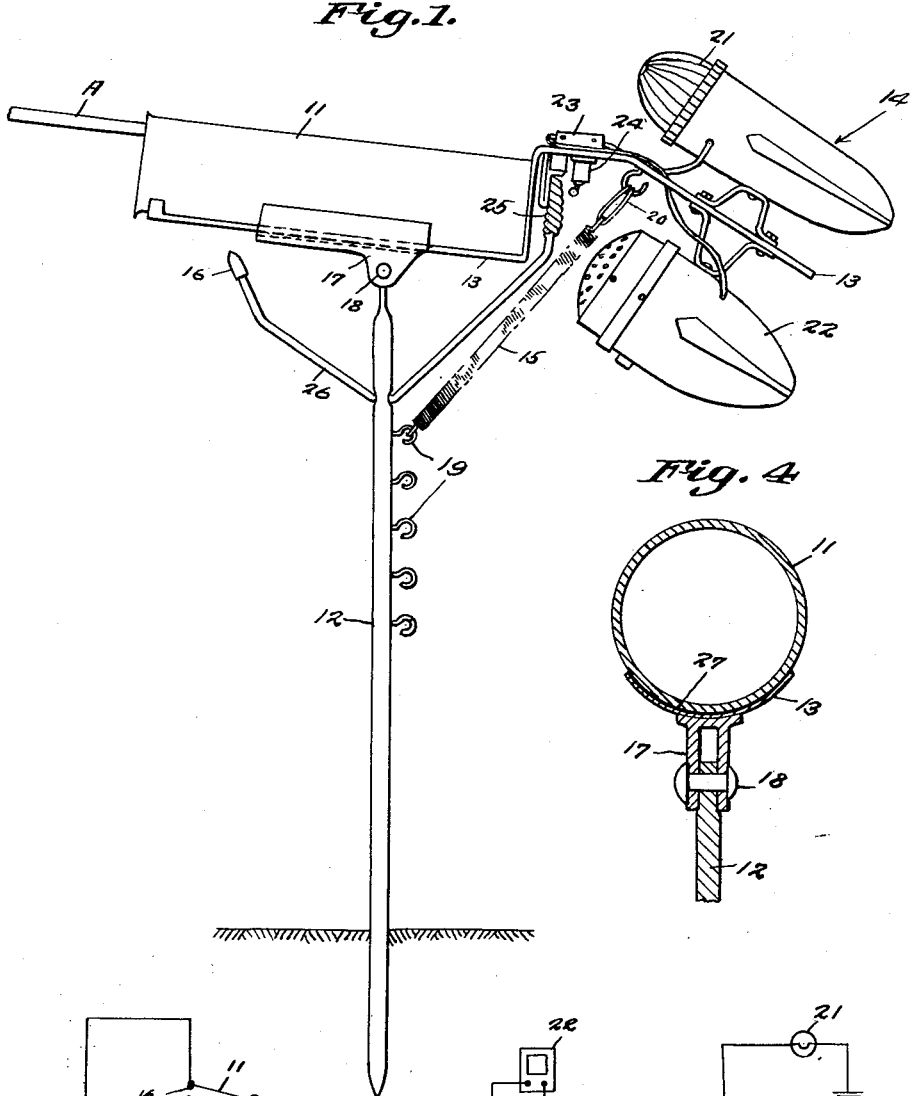
Clarence E. Hartley
INVENTOR
BY *CA Snow & Co.*
ATTORNEYS.

Dec. 17, 1957    C. E. HARTLEY    2,816,388
FISHING ROD SUPPORT AND ALARM
Filed Sept. 29, 1955    2 Sheets-Sheet 2
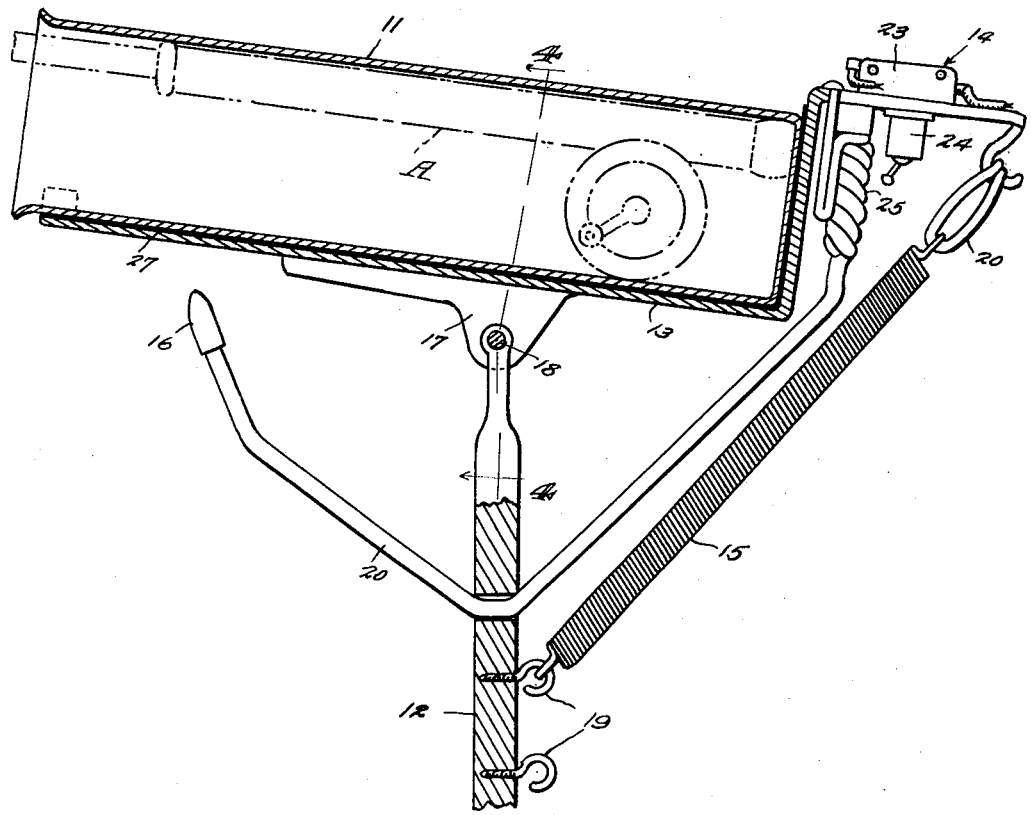
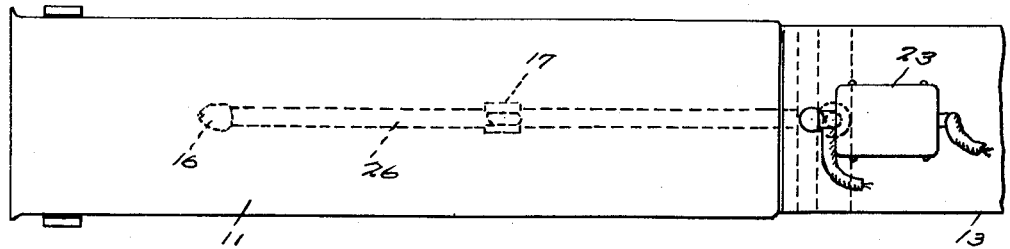
Clarence E. Hartley
INVENTOR
BY *CA Snow &Co.*
ATTORNEYS.

United States Patent Office 2,816,388
Patented Dec. 17, 1957

2,816,388

FISHING ROD SUPPORT AND ALARM

Clarence E. Hartley, Salisbury, N. C.

Application September 29, 1955, Serial No. 537,518

1 Claim. (Cl. 43—17)

This invention relates to a fishing rod support and alarm for holding the fishing rod and giving an audible or visible signal to the fisherman, when a fish strikes the hook.

Heretofore, no such device has been available on the market, which is practical, light in weight, readily portable, reliable, low in cost, and completely frees the hands and attention of the attending fisherman for other nearby chores.

An object of this invention is to provide such a device which is simple in form and construction, efficient, and automatic in use.

Another object is to provide a fishing rod support which is easily fixed where desired.

Other objects and advantages of the invention will become apparent in the body of the specification and claims.

The preferred embodiment of the invention is herein illustrated and described.

In the drawings:

Fig. 1 is an elevation view of my fishing rod support and alarm positioned for use.

Fig. 2 is an elevation view, enlarged and partly in section of the rod support and alarm.

Fig. 3 is a plan view of the housing tube and switch box.

Fig. 4 is an end view enlarged in section along line 4—4 of Fig. 2, of the housing tube mounted on its support post.

Fig. 5 is the electric wiring diagram for the signal device.

Various signals have been used by fishermen in the past to indicate the presence of fish taking the bait, but none is known which is sufficiently practical and useful to merit popular acceptance for any of many reasons.

My invention is a distinct improvement over the prior art, as a practical useful time saver. After the fisherman baits his hook and fixes his rod in the housing tube, he is free for other activities with the assurance of knowing when he has a strike.

This device fishing rod support and alarm consists essentially of the open end tubular housing 11, pivotally mounted on the upper end of depending support post 12, the structural frame 13 which holds the tubular housing 11 and on which is mounted the electrical signal device 14 with necessary wiring and switching control, and the resilient retractor 15, to keep the electric circuit normally open. When a fish nibbles on the bait or takes the hook, the tubular housing 11, which is holding the fisherman's rod, is swung downwardly sufficiently to touch the exposed contact point 16. This completes the circuit through the electrical signal device 14, which sets off the alarm to attract the attention of the attending fishermen.

The tubular housing 11 has an open outer end and is cylindrical in shape. It is made of thin metal or other suitable material and may be made by welding, riveting, casting, or otherwise. This housing is supported by and is seated in the structural frame 13. This housing has suitable means for releasably holding a fishing rod and reel A.

The structural frame 13 is preferably made of thin metal and is shaped to fit the underside of tubular housing 11. It has fitted thereto on its underside, as by spot welding, depending lugs 17. This frame turns upwardly and extends across the outer side of the inner end of the tubular housing 11. It is then turned rearwardly from the tubular housing and downwardly at an angle to form a support for the signal device 14 and its necessary connections. The lugs 17 are drilled transversely to form a bearing support for pivot pin 18, which extends through a similar opening in the upper end of depending support post 12. This post or rod 12 is non-circular in cross section towards its lower end and may have a thin laterally extending spade shaped flange thereon, so that when it is embedded in the ground it cannot be turned laterally from its original position. This post 12 is preferably of tubular metal with a sharply pointed lower end and may have midway of its length an outwardly extending projection to receive the foot of the fisherman or hammer blows to assist in driving it into the ground. The upper section of the support post has several attachment points or hooks 19, to which is attached the resilient retractor 15, which is shown as a coiled spring. As is apparent the particular hook that is used for this purpose will determine the elevation of the tubular housing 11 and the necessary pull on the fishing line to set off the alarm through the signal device 14.

The resilient retractor or coiled spring 15 is connected through a rubber band or other insulation 20 to an upper hook fixed on the underside of downwardly inclined frame 13.

The signal device 14 consists of a flashlight 21, such as used on bicycles and an audible annunciator 22, such as a horn, bell, or buzzer. These are fixed with brackets and bolts to opposed sides of the frame 13, the light 21 being above, so as to give an unobstructed view. These signal elements are wired through a switch box 23 and a selective toggle switch 24 mounted on the underside of structural frame 13. The wiring extends through the flat frame 13 and is formed into an expansible coil 25 and is threaded through a protective insulated shield 26 of stiff bendable material such as metal tubing or BX cable. This shield extends downwardly and towards the upper part of support post 12 and is mounted thereon and is attached thereto and may extend through this post, as shown. This shield extends further outwardly and upwardly toward the open end of tubular housing 11. The exposed contact point 16 is attached to the end of the circuit wire within shield 26. As noted, when the end of the tubular housing is depressed and touches contact point 16, the circuit is completed. The frame 13 is shown as insulated at 27 from housing 11, so as to form a return ground for the wiring circuit. However, the point of contact on frame 13 can be properly insulated and connected to an insulated wire for this return circuit. The light 21 and the audible annunciator 22 each, is powered by a dry cell battery within its respective housing, not shown, except diagrammatically in Fig. 5. This diagram, Fig. 5, shows the wiring for selective toggle switch 24. When the switch blade is at position B only an audible response is received. This is desirable for daytime fishing. When the switch blade is at point C the light 21 only is in circuit. When connected at D the audible annunciator 22 and light 21 are wired in parallel and both respond.

*Use and operation*

The support post 12 is first driven into the ground so that the tubular housing 11 points outwardly toward the fishing area. The resilient retractor in the form of the coiled spring 15 is attached to one of the hooks 19 after being first secured with the rubber band 20 to the structural frame 13 above. The three way selective toggle switch 24 is now set to give the proper desired signal. The fishing line is now arranged with baited hook and the fishing rod and reel A are inserted handle first into the tubular housing 11 and secured therein, after the cast is made. The fisherman now attends to other activities and awaits a signal to announce a nibble.

One embodiment of the invention has been disclosed herein, in detail. However, various modifications of the disclosed device can be made within the scope of the appended claims.

I claim:

A fishing rod support and alarm comprising a post adapted to be projected into the ground, a frame formed with a substantially L-shaped portion having a long substantially horizontal side and a short right angular side which extends in a substantially vertical direction, and an obtusely angled projection extending from the short side of said L-shaped portion, a tubular rod socket fixed to said long side and abutting said short side, means rockably securing said long side of said frame to the upper end of said post, a plurality of vertically spaced apart hooks carried by said post, a spring connected between a selected one of said hooks and said obtusely angled projection, an electric circuit, an audible signal means and a visual signal means in said circuit carried by said projection, a three position manual switch for simultaneously or selectively connecting one or the other of said signal means interposed in said circuit, and a second switch in said circuit including a contact comprising an insulated wire member passed through said post at an intermediate point and extending upwardly to a point adjacent said frame, the end of said insulated wire adjacent said frame being exposed, the other end of said wire extending to one side of said manual switch and insulated from said post, said frame being insulated from said rod socket and constituting the opposite side of said second switch, said spring normally holding said frame spaced from said contact.

References Cited in the file of this patent

UNITED STATES PATENTS

| 1,488,838 | Savoie | Apr. 1, 1924 |
| 2,170,000 | Eggleston | Aug. 22, 1939 |
| 2,457,075 | Williams | Dec. 21, 1948 |
| 2,642,690 | Soenksen | June 23, 1953 |
| 2,720,048 | Bracey et al. | Oct. 11, 1955 |